US012734659B2

(12) United States Patent
Taylor et al.

(10) Patent No.: US 12,734,659 B2
(45) Date of Patent: Sep. 15, 2026

(54) PISTON ALIGNMENT TOOL

(71) Applicant: FEDERAL-MOGUL MOTORPARTS LLC, Southfield, MI (US)

(72) Inventors: Christopher Taylor, Skokie, IL (US); Jean Joris, Kontich (BE); Hoover Oliver, Skokie, IL (US); Michael Sadowski, Skokie, IL (US)

(73) Assignee: FEDERAL-MOGUL MOTORPARTS LLC, Southfield, MI (US)

(*) Notice: Subject to any disclaimer, the term of this patent is extended or adjusted under 35 U.S.C. 154(b) by 313 days.

(21) Appl. No.: 18/418,912

(22) Filed: Jan. 22, 2024

(65) Prior Publication Data

US 2025/0235996 A1 Jul. 24, 2025

(51) Int. Cl.
*B25B 27/12* (2006.01)
*F02F 1/00* (2006.01)

(52) U.S. Cl.
CPC .............. *B25B 27/12* (2013.01); *F02F 1/004* (2013.01)

(58) Field of Classification Search
CPC ....... B25B 27/12; B25B 27/0028; B25B 9/00; F02F 1/004
See application file for complete search history.

(56) References Cited

U.S. PATENT DOCUMENTS

| | | | | |
|---|---|---|---|---|
| 1,367,622 A * | 2/1921 | Monckmeier | B25B 27/12 | 29/222 |
| 1,425,075 A * | 8/1922 | Cady | B25B 27/12 | 29/222 |
| 1,488,628 A * | 4/1924 | Watson | B25B 27/12 | 29/224 |
| 2,697,870 A * | 12/1954 | Zucker | B25B 27/12 | 29/222 |
| 3,707,027 A | 12/1972 | Davis et al. | | |
| 4,594,760 A * | 6/1986 | Dillard | F02F 7/0046 | 29/888.011 |
| 6,318,551 B1 * | 11/2001 | Calvert | B23P 6/02 | 206/319 |
| 2002/0069499 A1 * | 6/2002 | Foster | B25B 27/12 | 29/222 |
| 2014/0325840 A1 * | 11/2014 | Morgan | B23B 47/34 | 29/888.061 |
| 2016/0067922 A1 * | 3/2016 | Voris | B29C 64/393 | 425/150 |

FOREIGN PATENT DOCUMENTS

| | | |
|---|---|---|
| CN | 201220397 Y | 4/2009 |
| CN | 204658343 U | 9/2015 |
| CN | 205572324 U | 9/2016 |

(Continued)

*Primary Examiner* — Joel D Crandall

(74) *Attorney, Agent, or Firm* — Reising Ethington P.C.

(57) ABSTRACT

A piston alignment tool and an engine kit having the piston alignment tool help facilitate improved positioning of a piston with respect to a cylinder liner. The piston alignment tool includes a body and an inner guide surface extending along an inner diameter of the body. The inner guide surface is configured to guide the piston with respect to an inner diameter of the cylinder liner. An axially extending overhang engagement tab extends from the body, with the axially extending overhang engagement tab being configured to interface with an outer circumference of the cylinder liner.

20 Claims, 3 Drawing Sheets

(56) References Cited

FOREIGN PATENT DOCUMENTS

| | | | | | |
|---|---|---|---|---|---|
| CN | 205968150 | U | | 2/2017 | |
| CN | 109366414 | A | | 2/2019 | |
| CN | 209273249 | U | | 8/2019 | |
| DE | 4216564 | A1 | * | 12/1992 | ......... B25B 27/0035 |
| JP | H05162089 | A | | 6/1993 | |
| WO | WO-8403082 | A1 | * | 8/1984 | ............. B25B 27/12 |
| WO | WO-2014080125 | A2 | * | 5/2014 | ......... B25B 27/0035 |

* cited by examiner

PISTON ALIGNMENT TOOL

TECHNICAL FIELD

The present disclosure generally relates to vehicle components and, in particular, to aligning engine pistons within cylinder liners.

BACKGROUND

When cylinder kits are assembled, the piston is typically inserted crown-down in the cylinder liner, usually without rings, for shipping. Normally this does not create major problems as the piston aligns itself to the bore and slides in. However, in some instances, the piston may be heavy and contact between the piston crown and liner flange are almost certain. This can result in the piston crown becoming scratched, dinged, and marred which is less than ideal, and could result in engine performance issues. While alignment tools for inserting the piston into the cylinder liner exist, they are generally more complex in structure and may be difficult to manufacture and use.

SUMMARY

According to one embodiment, there is provided a piston alignment tool for a cylinder liner and a piston. The piston alignment tool includes a body and an inner guide surface extending along an inner diameter of the body. The inner guide surface is configured to guide the piston with respect to an inner diameter of the cylinder liner. An axially extending overhang engagement tab extends from the body, with the axially extending overhang engagement tab being configured to interface with an outer circumference of the cylinder liner.

In some embodiments, the axially extending overhang engagement tab extends from an outer circumference of the body.

In some embodiments, there is a second axially extending overhang engagement tab extending from the body, the second axially extending overhang engagement tab being configured to interface with the outer circumference of the cylinder liner.

In some embodiments, the axially extending overhang engagement tab is diametrically opposed from the second axially extending overhang engagement tab.

In some embodiments, there is a third axially extending overhang engagement tab extending from the body, the third axially extending overhang engagement tab being configured to interface with the outer circumference of the cylinder liner.

In some embodiments, there is a fourth axially extending overhang engagement tab extending from the body, the fourth axially extending overhang engagement tab being configured to interface with the outer circumference of the cylinder liner.

In some embodiments, the axially extending overhang engagement tab is diametrically opposed to the second axially extending overhang tab, and the third axially extending overhang engagement tab is diametrically opposed to the fourth axially extending overhang tab.

In some embodiments, each axially extending overhang engagement tab has a rounded contour contact surface.

In some embodiments, there is a plurality of at least partially recessed portions between each adjacent axially extending overhang engagement tab.

In some embodiments, each at least partially recessed portion comprises a straight segment.

In some embodiments, a length of each straight segment is less than an outer diameter of the cylinder liner.

In some embodiments, each of the rounded axially extending overhang engagement tabs and each of the straight segments comprise an outer circumference of the body such that the outer circumference of the body has a squircle shape.

In some embodiments, the outer diameter of the body and the inner diameter of the body are concentric.

In some embodiments, there is a plurality of at least partially extended portions between each adjacent axially extending overhang engagement tab.

In some embodiments, each at least partially extended portion comprises a straight segment.

In some embodiments, each of the straight segments are configured to interface with a packaging container.

In some embodiments, the body has a honeycomb microstructure.

In some embodiments, there is an engine kit comprising the piston alignment tool, wherein the axially extending overhang engagement tab directly interfaces with the outer circumference of the cylinder liner.

In some embodiments, the axially extending overhang engagement tab has a rounded contour contact surface adjacent an at least partially extended portion.

In some embodiments, the at least partially extended portion contacts an inner surface of a packaging container.

Various aspects, embodiments, examples, features and alternatives set forth in the preceding paragraphs, in the claims, and/or in the following description and drawings may be taken independently or in any combination thereof. For example, features disclosed in connection with one embodiment are applicable to all embodiments in the absence of incompatibility of features.

BRIEF DESCRIPTION OF THE DRAWINGS

Preferred example embodiments will hereinafter be described in conjunction with the appended drawings, wherein like designations denote like elements, and wherein.

DETAILED DESCRIPTION

The piston alignment tool embodiments described herein can help act as a barrier between the piston crown and cylinder liner flange, while having a more easily manufacturable structure. The piston alignment tool can help streamline assembly of an engine kit, by being easier to place and maintain in position with respect to the piston and the cylinder liner. The piston alignment tool can improve alignment of the piston into the liner bore, while having a structure suitable for shipping with the engine kit to add further protection during transit to the end user.

Figure 1:
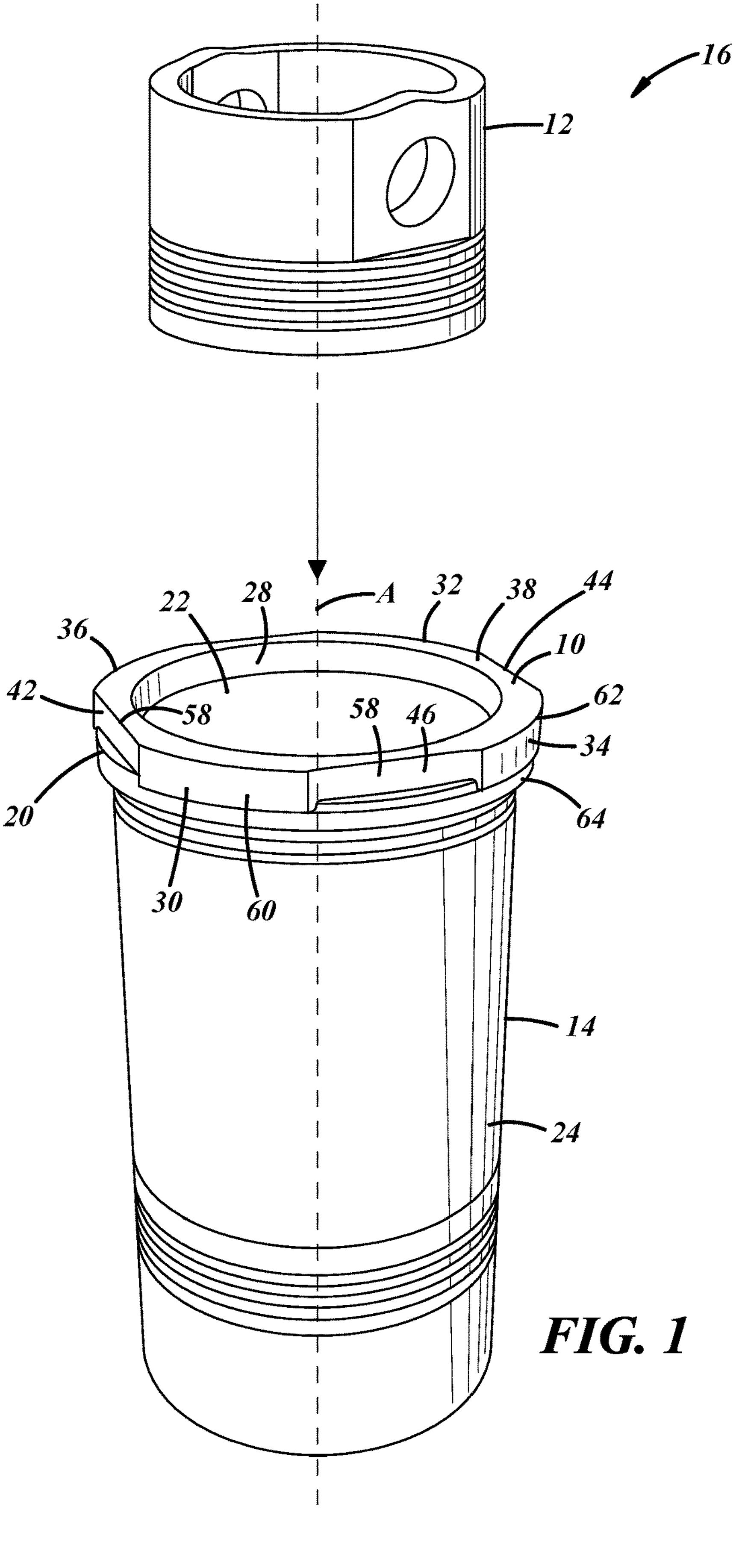
FIG. 1 is a perspective view of an engine piston, cylinder liner, and piston alignment tool in accordance with one embodiment.

FIG. 1 illustrates a piston alignment tool 10 that helps align a piston 12 with respect to a cylinder liner 14. The piston alignment tool 10, piston 12, and cylinder liner 14, may be part of an engine kit 16 which can be used to replace or rebuild a vehicle engine, and more particularly, an automotive or industrial vehicle engine in this embodiment. The kit 16 may include other engine components, including but not limited to one or more piston rings, a piston pin, bushings, seals, etc. The engine kit 16 may also include a packaging container 18 (see e.g., FIG. 4) to hold all of the components of the kit.

Figure 2:
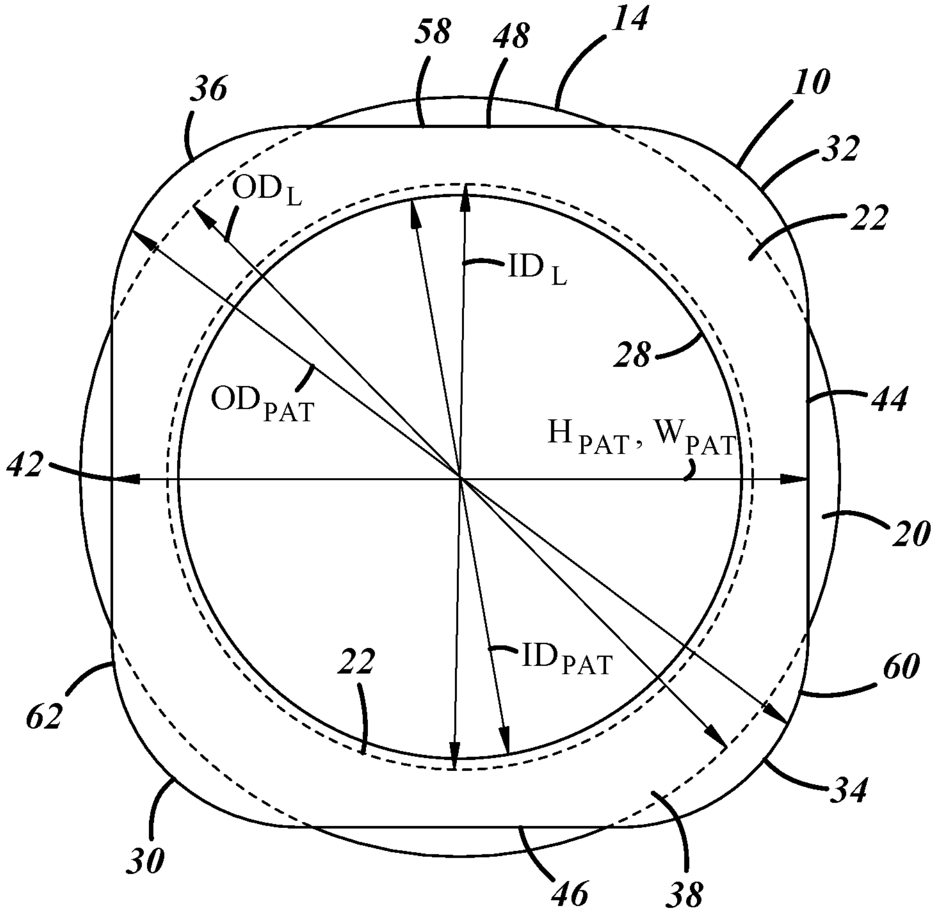
FIG. 2 is a top view of the piston alignment tool and schematically shows how it is positioned with respect to the cylinder liner of FIG. 1.

With reference to FIGS. 1 and 2, the piston alignment tool 10 is configured to attach to a flange 20 of the cylinder liner 14 to help guide the alignment of the piston 12 into an internal bore 22 of the liner. As illustrated, in this embodiment, the piston alignment tool 10, the piston 12, cylinder liner 14, and internal bore 22 are all concentrically arranged with respect to the axis A. This can help improve alignment between the piston 12 and liner 14. Additionally, as used herein, axial or axially extending means generally parallel to the axis A (+/−5 deg.), and radial or radially extending means generally orthogonal with respect to the axis A (+/−5 deg.). For components, surfaces, etc. that are described as radially or axially extending, only a portion thereof need to be radially or axially extending, respectively. As mentioned, in the illustrated embodiment, the piston alignment tool 10 attaches to the flange 20, which extends radially outward from a main cylinder portion 24 of the liner 14. However, it may be possible to have an implementation where the piston alignment tool 10 attaches to a flangeless end of the liner 14.

Figure 3:
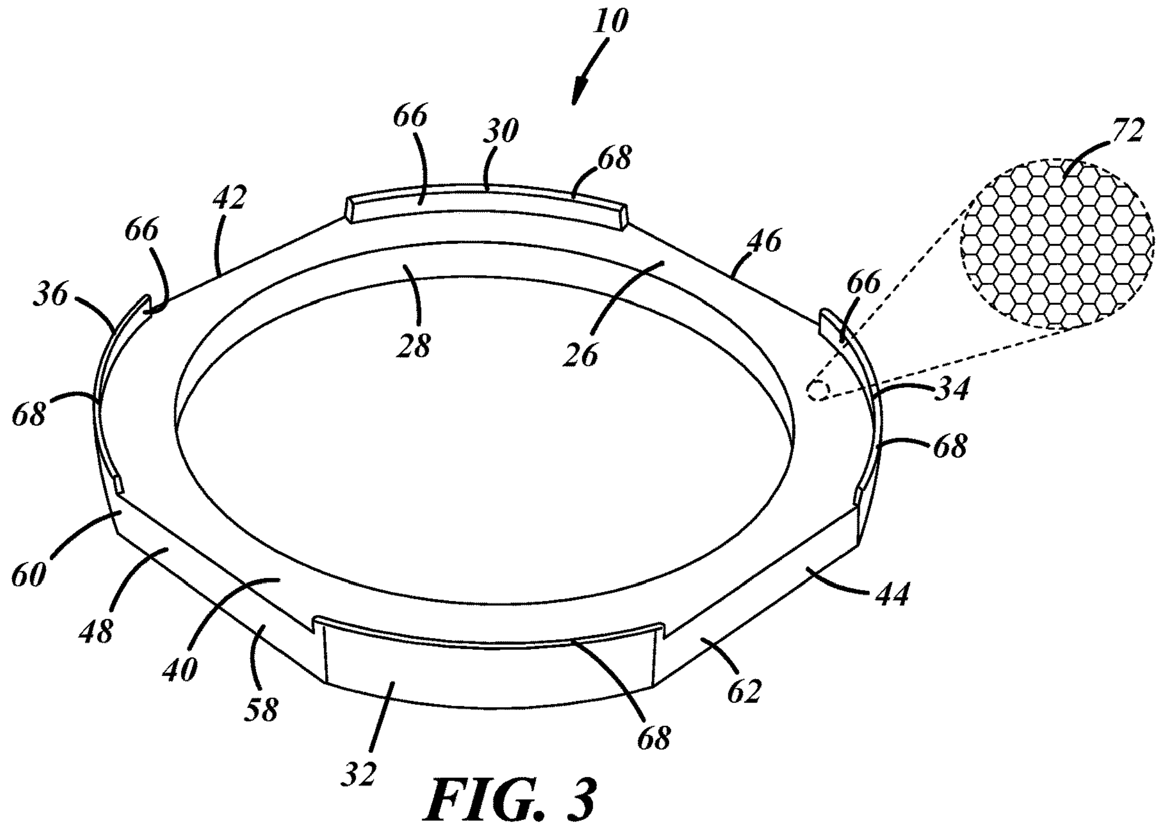
FIG. 3 is a perspective view of a cylinder-facing side of the piston alignment tool of FIG. 1, also showing the microstructure of the piston alignment tool.

As shown in FIGS. 1-4, the piston alignment tool 10 includes a body 26, an inner guide surface 28 located along an inner diameter $ID_{PAT}$ of the body, and a plurality of axially extending overhang engagement tabs 30, 32, 34, 36 that extend from the body. FIG. 1 shows a piston-facing side 38 of the body 26, and FIG. 3 shows a cylinder-facing side 40 of the body 26, with the piston-facing side and the cylinder-facing side being axially opposed. As detailed further below, the embodiment shown in FIGS. 1-3 includes a plurality of partially recessed portions 42, 44, 46, 48 between each of the axially extending overhang engagement tabs 30, 32, 34, 36. The embodiment of FIG. 4, on the other hand, has a plurality of partially extended portions 50, 52, 54, 56 instead of the partially recessed portions 42, 44, 46, 48. In the illustrated embodiments, each of the portions 42-56 include a straight segment 58 (only a few are labeled for clarity purposes), which can be helpful for packaging the engine kit 16, as explained further below. Depending on the embodiment, the portions 42-48 or 50-56, along with the axially extending overhang engagement tabs 30, 32, 34, 36 are situated along the outer diameter $OD_{PAT}$ and make up an outer circumference 60 of the body 26 of the piston alignment tool 10.

With particular reference to FIG. 2, the body 26 makes up the main radially extending portion of the piston alignment tool 10, extending between the inner diameter $ID_{PAT}$ and the outer diameter $OD_{PAT}$ (the $OD_{PAT}$ is taken between two diametrically opposed axially extending overhang engagement tabs 30, 32 or 34, 36, respectively). With the exception of the axially extending overhang engagement tabs 30, 32, 34, 36, the cylinder-facing side 40 of the body is generally planar to better conform to the flange 20 of the cylinder liner 14. The body 26 includes an inner guide surface 28 along the inner diameter $ID_{PAT}$. The inner diameter $ID_{PAT}$ of the body 26 is less than an inner diameter $ID_L$ of the cylinder liner 14. This allows for the cylinder liner 14 to be protected during insertion of the piston 12, as the inner guide surface 28 can act as a barrier between the piston crown and liner flange 20. Additionally, the inner guide surface 28 has a conical shape that aligns the piston 12 to the inner diameter $ID_L$ of the liner 14 as it descends downward through the tool 10 (e.g., the $ID_{PAT}$ is slight larger at the piston-facing side 38 than at the cylinder-facing side 40). Toward the cylinder-facing side 40 of the tool 10, the diameter $ID_{PAT}$ is slight smaller than the diameter $ID_L$ to help ensure that there will not be edge contact between the piston 12 and the liner 14.

As illustrated in FIG. 2, in this embodiment, the axially extending overhang engagement tabs 30, 32, 34, 36, along with the partially recessed portions 42, 44, 46, 48 make up the outer circumference 60 of the body 26. It should be understood, however, that the partially recessed portions 42, 44, 46, 48 may not be partially recessed with respect to the outer circumference 60 of the body 26 (although that is certainly possible), but instead, are partially recessed so as to expose a portion of the flange 20 of the cylinder liner 14. This additional space may be used within the packaging 18 to provide more space for extra components in the kit 16. This configuration also results in a squircle shape 62 as shown in FIGS. 1-3, which can be easier to manufacture than other embodiments (i.e., circle-shaped perimeter at just the axially extending overhang engagement tabs 30, 32, 34, 36 and square-shaped perimeter at just the partially recessed portions 42, 44, 46, 48). This also results in having the $OD_{PAT}$, $OD_L$, $ID_{PAT}$, and $ID_L$ to all define concentric circles with respect to the axis A, which can help promote alignment between the piston 12 and the cylinder liner 14. However, other shapes are certainly possible. Given the shape illustrated in FIGS. 1-3, each straight segment 58 along the entirety of each partially recessed portion 42, 44, 46, 48 has a length that is less than the outer diameter $OD_L$ of the liner 14. Additionally, a height $H_{PAT}$ and/or width $W_{PAT}$ of the body 26 taken between each of the opposing partially recessed portions 42, 44 and 46, 48 is less than an outer diameter ODI, of the liner 14.

The outer diameter $OD_{PAT}$ of the body 26, as defined between diametrically opposed axially extending overhang engagement tabs 30, 32 and 34, 36, respectively, is preferably slightly greater than the outer diameter $OD_L$ of the liner 14. This helps provide an active engagement area around an outer circumference 64 of the liner 14 for which each tab 30, 32, 34, 36 can directly interface against the liner 14. The outer circumference 64 is the area of the cylinder 14 that can make contact with the axially extending overhang engagement tabs 30, 32, 34, 36. In this embodiment, the outer circumference 64 is on the flange 20, which is radially a bit larger than the circumference at the main cylinder portion 24, but it should be understood that it is possible for the outer circumference 64 to have a different shape, or no flange at all, to cite a few examples. In the illustrated embodiments, the first axially extending overhang engagement tab 30 is diametrically opposed from the second axially extending overhang engagement tab 32, and the third axially extending overhang engagement tab 34 is diametrically opposed from the fourth axially extending overhang engagement tab 36. Additionally, the tabs 30, 32, 34, 36 are spaced radially equidistantly, which can help provide more even engagement around the cylinder 14.

As shown more particularly in FIG. 3, the axially extending overhang engagement tabs 30, 32, 34, 36 include a rounded contour contact surface 66 that extends from the body 26 to a distal edge 68 of each tab. The rounded contour contact surface 66 is designed in this implementation to help hold the tool 10 in a radially secure position so as to prevent contact of the piston 12 with the $ID_L$ of the liner 14 by keeping the $ID_{PAT}$ aligned with the $ID_L$. Unlike more complex structures that are more positively affixed with designated fasteners or the like, the axially extending overhang engagement tabs 30, 32, 34, 36 can simplify the manufacturing process by being easier to install onto the liner 14 and align. In some embodiments, there may be more or less axially extending overhang engagement tabs than what is particularly illustrated, or one or more tabs 30, 32, 34, 36 may be alternately configured. To cite one example, the distal end 68 of each tab 30, 32, 34, 36 may include a radially extending inward flange that engages under the flange 20 of the cylinder liner 14. In another potential example, the tabs 30, 32, 34, 36 may be biased or spring-loaded to provide more active engagement with the cylinder liner 14. However, it may be easier to manufacture the embodiment illustrated in FIG. 3, where each tab 30, 32, 34, 36 only extends axially, and not radially.

Figure 4:
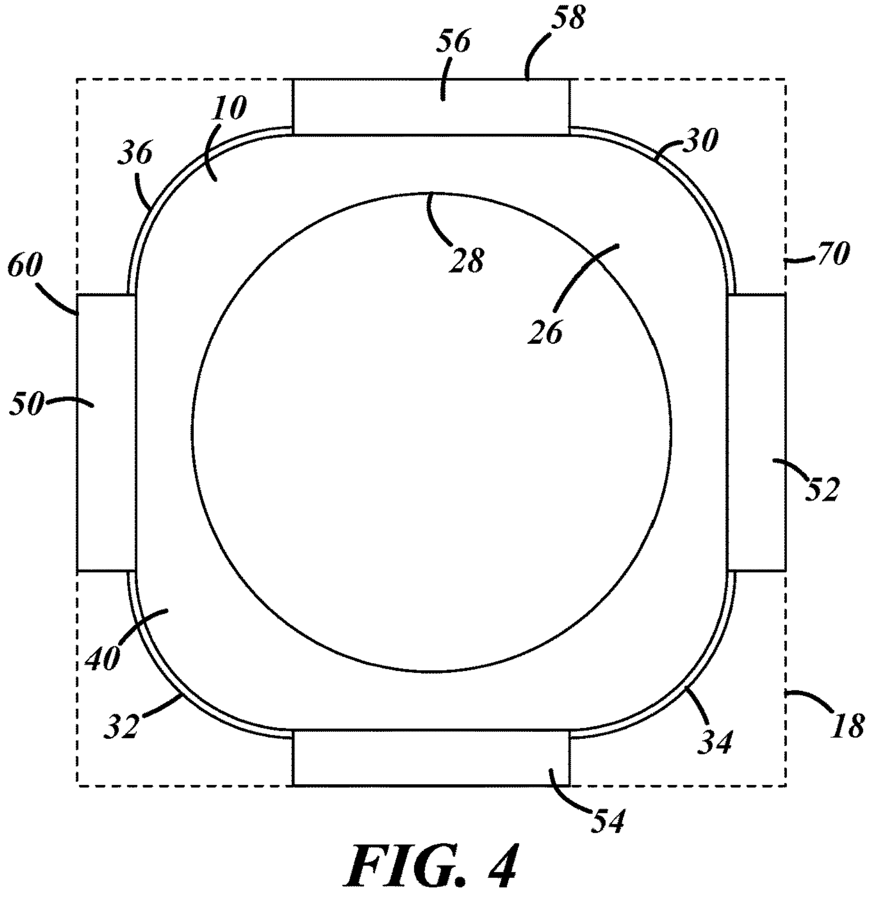
FIG. 4 shows another embodiment of a piston alignment tool.

In an advantageous embodiment, the piston alignment tool 10 is used in an engine kit 16. Typically, when engine or cylinder kits 16 are assembled, the piston 12 is inserted crown-down in the cylinder liner 14, typically without rings for shipping. The tool 10 can act as a barrier between the piston 12 and the liner 14 in the kit 16. As shown schematically in FIG. 4, the tool 10 may be sized to more securely fit in the packaging container 18 of the kit 16. The packaging container 18 is a box 70 in this implantation, which is used to accommodate the piston alignment tool 10, the piston 12, and the cylinder liner 14. Other components may also be included within the packaging container 18, and with the embodiment shown in FIG. 4, the partially extended portions 50, 52, 54, 56 may be used as a housing surface to help hold other components of the kit 16. Additionally, the partially extended portions 50, 52, 54, 56 have a straight segment 58 that mimics the internal shape of the container 18 or box 70, which can further help stabilize the components of the kit 16 with respect to the container, particularly when the straight segments 58 directly contact the box 70. In this implementation, the tool 10 may be mass-manufactured and used to ship with the kit 16 so as to add further protection during transit to the end user. Additionally, by dimensionally matching the profile of the box 18, as illustrated in FIG. 4, the tool 10 has the potential to add further stability to the parts of the kit 16 during shipping.

In one embodiment, the tool 10 is manufactured using an additive manufacturing or three-dimensional printing process, although other forming processes are certainly possible. The tool 10 may be made from plastic, metal, or another operable material, with plastic being preferred for ease of manufacture and cost. As shown schematically in FIG. 3, with additive manufacturing, a honeycomb microstructure 72 may help impart additional structural integrity. Having the walls of the honeycomb microstructure 72 extend axially may impart additional axial strength to the tool 10.

It is to be understood that the foregoing is a description of one or more preferred example embodiments of the invention. The invention is not limited to the particular embodiment(s) disclosed herein, but rather is defined solely by the claims below. Furthermore, the statements contained in the foregoing description relate to particular embodiments and are not to be construed as limitations on the scope of the invention or on the definition of terms used in the claims, except where a term or phrase is expressly defined above. Various other embodiments and various changes and modifications to the disclosed embodiment(s) will become apparent to those skilled in the art. All such other embodiments, changes, and modifications are intended to come within the scope of the appended claims.

As used in this specification and claims, the terms "for example," "e.g.," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all the following: "A"; "B"; "C"; "A and B"; "A and C"; "B and C"; and "A, B, and C."

The invention claimed is:

1. A piston alignment tool for a cylinder liner and a piston, comprising:

a body;

an inner guide surface extending along an inner diameter of the body, the inner guide surface being configured to guide the piston with respect to an inner diameter of the cylinder liner; and an axially extending overhang engagement tab radially spaced from the inner guide surface, the axially extending overhang engagement tab extending from the body, the axially extending overhang engagement tab being configured to interface with an outer circumference of the cylinder liner.

2. The piston alignment tool of claim 1, wherein the axially extending overhang engagement tab extends from an outer circumference of the body.

3. The piston alignment tool of claim 1, further comprising a second axially extending overhang engagement tab extending from the body, the second axially extending overhang engagement tab being configured to interface with the outer circumference of the cylinder liner.

4. The piston alignment tool of claim 3, wherein the axially extending overhang engagement tab is diametrically opposed from the second axially extending overhang engagement tab.

5. The piston alignment tool of claim 4, further comprising a fourth axially extending overhang engagement tab extending from the body, the fourth axially extending overhang engagement tab being configured to interface with the outer circumference of the cylinder liner.

6. The piston alignment tool of claim 5, wherein the axially extending overhang engagement tab is diametrically opposed to the second axially extending overhang tab, and the third axially extending overhang engagement tab is diametrically opposed to the fourth axially extending overhang tab.

7. The piston alignment tool of claim 5, wherein each axially extending overhang engagement tab has a rounded contour contact surface.

8. The piston alignment tool of claim 7, further comprising a plurality of at least partially recessed portions between each adjacent axially extending overhang engagement tab.

9. The piston alignment tool of claim 8, wherein each at least partially recessed portion comprises a straight segment.

10. The piston alignment tool of claim 9, wherein each of the rounded axially extending overhang engagement tabs and each of the straight segments comprise an outer circumference of the body such that the outer circumference of the body has a squircle shape.

11. The piston alignment tool of claim 10, wherein the outer diameter of the body and the inner diameter of the body are concentric.

12. The piston alignment tool of claim 5, further comprising a plurality of at least partially extended portions between each adjacent axially extending overhang engagement tab.

13. The piston alignment tool of claim 12, wherein each at least partially extended portion comprises a straight segment.

14. The piston alignment tool of claim 13, wherein each of the straight segments are configured to interface with a packaging container.

15. The piston alignment tool of claim 3, further comprising a third axially extending overhang engagement tab extending from the body, the third axially extending overhang engagement tab being configured to interface with the outer circumference of the cylinder liner.

16. The piston alignment tool of claim 1, wherein the body has a honeycomb microstructure.

17. An engine kit comprising the piston, the cylinder liner, and the piston alignment tool of claim 1, wherein the axially extending overhang engagement tab directly interfaces with the outer circumference of the cylinder liner.

18. The engine kit of claim 17, wherein the axially extending overhang engagement tab has a rounded contour contact surface adjacent an at least partially extended portion.

19. The engine kit of claim 18, further comprising a packaging container, wherein the at least partially extended portion contacts an inner surface of the packaging container.

20. The engine kit of claim 17, wherein the piston alignment tool further comprises a plurality of axially extending overhang engagement tabs, wherein each axially extending overhang engagement tab has a rounded contour contact surface and a plurality of at least partially recessed portions between each adjacent axially extending overhang engagement tab, wherein each at least partially recessed portion comprises a straight segment, and wherein a length of each straight segment is less than an outer diameter of the cylinder liner.

* * * * *